US007697752B2

(12) United States Patent
Li et al.

(10) Patent No.: US 7,697,752 B2
(45) Date of Patent: Apr. 13, 2010

(54) METHOD AND APPARATUS FOR PERFORMING OBJECT DETECTION

(75) Inventors: Dongge Li, Hoffman Estates, IL (US); Bhavan R. Gandhi, Vernon Hills, IL (US); Zhu Li, Palatine, IL (US)

(73) Assignee: General Instrument Corporation, Horsham, PA (US)

( * ) Notice: Subject to any disclaimer, the term of this patent is extended or adjusted under 35 U.S.C. 154(b) by 1021 days.

(21) Appl. No.: 11/312,219

(22) Filed: Dec. 20, 2005

(65) Prior Publication Data

US 2007/0140550 A1 Jun. 21, 2007

(51) Int. Cl.
*G06K 9/62* (2006.01)
(52) U.S. Cl. .................. 382/159; 382/103; 382/118; 382/190; 382/225
(58) Field of Classification Search .............. 382/103, 382/115, 159, 118, 190, 225
See application file for complete search history.

(56) References Cited

U.S. PATENT DOCUMENTS

| | | | | |
|---|---|---|---|---|
| 7,274,832 | B2 * | 9/2007 | Nicponski | 382/297 |
| 7,373,012 | B2 * | 5/2008 | Avidan et al. | 382/260 |
| 7,454,039 | B2 * | 11/2008 | Tu et al. | 382/115 |
| 2003/0108244 | A1 | 6/2003 | Li et al. | |
| 2003/0147558 | A1 * | 8/2003 | Loui et al. | 382/225 |
| 2004/0022442 | A1 | 2/2004 | Kim et al. | |
| 2004/0062424 | A1 | 4/2004 | Mariani et al. | |
| 2004/0122675 | A1 * | 6/2004 | Nefian et al. | 704/276 |
| 2005/0089246 | A1 * | 4/2005 | Luo | 382/286 |
| 2005/0276446 | A1 * | 12/2005 | Chen et al. | 382/103 |
| 2006/0008149 | A1 * | 1/2006 | Tu et al. | 382/190 |
| 2006/0187305 | A1 * | 8/2006 | Trivedi et al. | 348/169 |
| 2006/0285747 | A1 * | 12/2006 | Blake et al. | 382/180 |
| 2007/0031037 | A1 * | 2/2007 | Blake et al. | 382/173 |
| 2007/0091203 | A1 * | 4/2007 | Peker et al. | 348/415.1 |
| 2007/0122039 | A1 * | 5/2007 | Zhang et al. | 382/199 |
| 2007/0139251 | A1 * | 6/2007 | Shu | 342/25 R |

OTHER PUBLICATIONS

S. Satoh, Y. Nakamura, and T. Kanade, "Name-It: Naming and Detecting Faces in News Videos," IEEE Multimedia, pp. 22-35, Jan. 1999.

Ming-Hsuan Yang, David Kriegman, Narendra Ahuja, "Detecting Faces in Images: A Survey," IEEE Trans. on Pattern Recognition and Machine Intelligence, vol. 24, No. 1, Jan. 2002.

J. Yang, X. Zhu, R. Gross, J. Kominek, Y. Pan, and A. Waibel, "Multimodal people ID for a multimedia meeting browser," Proceedings of ACM Multimedia, 1999.

Christel-Ioic Tisse, Lionel Martin, Lionel Torres, Michel Robert, "Person Identification technique using human iris recognition", The 15th International Conference on Vision Interface, May 27-29, 2002, Calgary, Canada.

Dongge Li, Gang Wei, Nevenka Dimitrova, and Ishwar Sethi, "Person Identification in TV Programs," Journal of Electronic Imaging, vol. 10, Issue 4, pp. 930-938, Oct. 2001.

Gang Wei, Dongge Li, and Ishwar K. Sethi, "Detection of Side-View Faces in Color Images," Proceedings Fifth IEEE Workshop on Applications of Computer Vision, pp. 79-84, Palm Springs, CA, Dec. 4-6, 2000.

* cited by examiner

*Primary Examiner*—Gregory M Desire
(74) *Attorney, Agent, or Firm*—Larry T. Cullen

(57) ABSTRACT

An object detection algorithm that generates a two-layer Gaussian Mixture Model (GMM) during a training session, and subsequent to the training session, uses the two-layer GMM to perform face detection. No labeling of local features is needed. The only input that is provided by a user is the setting of a few global parameters for the image being captured during the training session, such as, for example, the person's facial pose.

28 Claims, 3 Drawing Sheets

METHOD AND APPARATUS FOR PERFORMING OBJECT DETECTION

BACKGROUND OF THE INVENTION

1. Field of the Invention

The invention relates to image analysis, and more particularly, to using a Gaussian Mixture Model (GMM) image analysis technique to perform object detection.

2. Description of the Related Art

Face detection is used in a variety of technical fields including, for example, security, military, multimedia database management, and entertainment. Extensive efforts have been made during the last couple of decades in these areas to improve face detection techniques. Face detection often must be performed before face recognition can be attempted. Therefore, the face detection process may be viewed as part of the face recognition process.

Current face detection techniques can generally be classified into three categories, namely, template-based methods, knowledge-based methods and appearance-based methods. In template-based methods, several templates are stored that describe either the entire face pattern or separate local facial features. The correlation between an input image and the stored templates are then evaluated in order to perform face detection. Knowledge-based methods utilize a set of rules to capture the relationships between facial features. Face detection is then performed by examining the input image areas based on the pre-defined rules of the rule set. Appearance-based methods use face models that are first learned using a number of exemplary face images. Theses learned models are then used to perform face detection.

To date, appearance-based methods have achieved the best detection accuracy. The learning methods used in appearance-based methods include, for example, neural networks (NNs), support vector machines (SVMs), linear discriminate analysis (LDA), Hidden Markov Model (HMM). Face detection based on NNs is one of the best existing methods currently available. However, existing NN systems generally only work well for frontal face poses, and do not effectively handle faces with multiple poses.

All of the methods described above only detect faces for a specific pose. Dedicated pose estimation is normally needed for the candidate region before the face detection can be performed. Face detection using the HMM technique has been proposed for the detection of side-view face poses. With this technique, two HMMs are trained to discriminate face profiles from non-face profiles.

Compared to many other pattern recognition methods, the power of the HMM technique lies in its ability to tolerate pattern variations as long as the same transition patterns exist between the same variations. However, the HMM technique has a disadvantage in that the state distribution and the transition probabilities are defined independently. Although the HMM technique provides limited support for controlling the state transition globally, it does not describe a complex pattern very well when the states and/or their transitions are controlled by certain common global settings and are thus not independent.

Another known technique for face detection uses a set of classifiers/recognizers to detect salient facial features, and then integrates the feature detection results based on their spatial configurations, such as location, scale and pose. This technique has the advantage of handling large variations that result from different facial appearances, poses, and illumination conditions. However, the salient facial features need to be labeled in order to train the facial feature recognizers. This introduces some drawbacks. First of all, only clearly defined features such as nose, mouth, and eyes are suitable for manual labeling. Other features such as hair and face areas are difficult to define in manual labeling in terms of boundaries and center positions. Secondly, even for salient features, manual labeling does not provide optimized segmentation. It is difficult to determine, for example, if eye areas should also include eyebrows. In addition, manual labeling may include errors in determining the boundary or center of a salient feature. Thirdly, like other existing face detection systems, a different pattern needs to be learned for each pose, and knowledge learned from different poses generally cannot be shared.

Accordingly, a need exists for a technique for performing face detection that overcomes the aforementioned shortcomings of the aforementioned approaches, such as being limited with respect to pose, the requirement to manually label local features, etc., and thus is capable of robustly detecting complex patterns without being limited to certain poses and without requiring manual labeling of local features.

DETAILED DESCRIPTION

Figure 1:
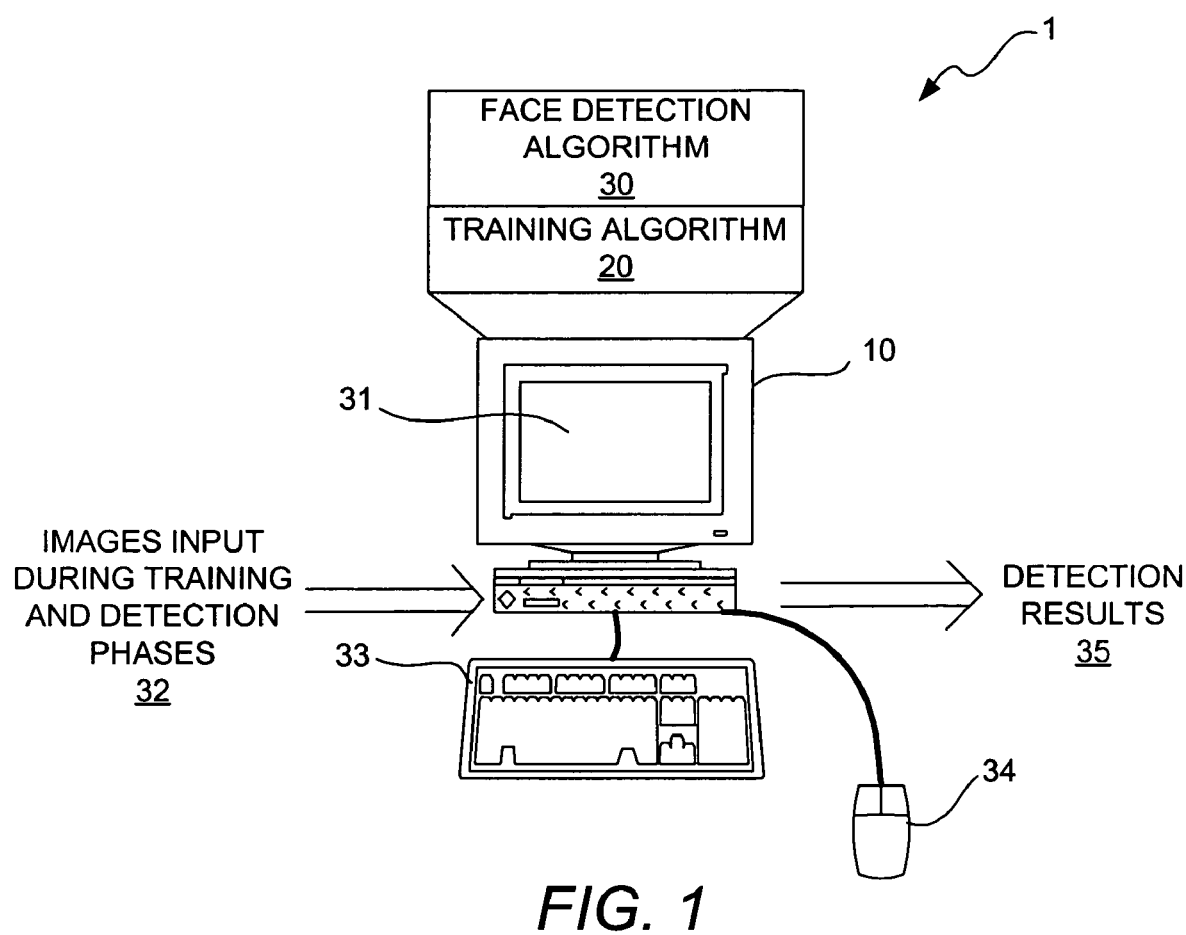
FIG. 1 illustrates an apparatus for performing face detection.

FIG. 1 illustrates the apparatus 1 in accordance with the preferred embodiment, which typically comprises a computer 10 programmed to execute a training algorithm 20 and a face detection algorithm 30. A two-layer Gaussian Mixture Model (GMM) is trained during a training session. Subsequent to the training session, the trained two-layer GMM is used to perform face detection. As described in detail below with reference to FIGS. 2 and 3, the two-layer GMM is a combination of a first-layer GMM and a second-layer GMM. The first-layer GMM is made up of Gaussian spatial distributions of local features (e.g., the eyes, nose, mouth, lips, chin, forehead, etc.). The second-layer GMM is made up of Gaussian gray scale distributions of local features. Thus, the combined two-layer GMM defines facial features in terms of both spatial and gray scale information.

Unlike some of the aforementioned face detection techniques, no labeling of local features is needed. The only input that may be needed from the user is the setting of a few global parameters for the face images that are processed during the training session, such as, for example, the person's facial pose (e.g., front view, left side view, right side view, 0°, 30°, 90°, 120°, etc.) when the image is captured. Other examples of global parameters include the distance of the person from the image capture device (e.g., a camera) when the image was captured (e.g., several meters), the size of the person's face (e.g., 200×200 pixels), whether the person is smiling, whether the person is wearing eyeglasses, etc. Therefore, the apparatus 1 typically also includes a monitor 31 for displaying captured images 32 and menus (not shown) that provide information to the user. The apparatus 1 typically also includes one or more input devices, such as a keyboard 33 and/or a mouse 34, which may be used to set global parameters. The output of the face detection software program 20 is the face detection results 35, i.e., whether or not a face has been detected.

Figure 2:
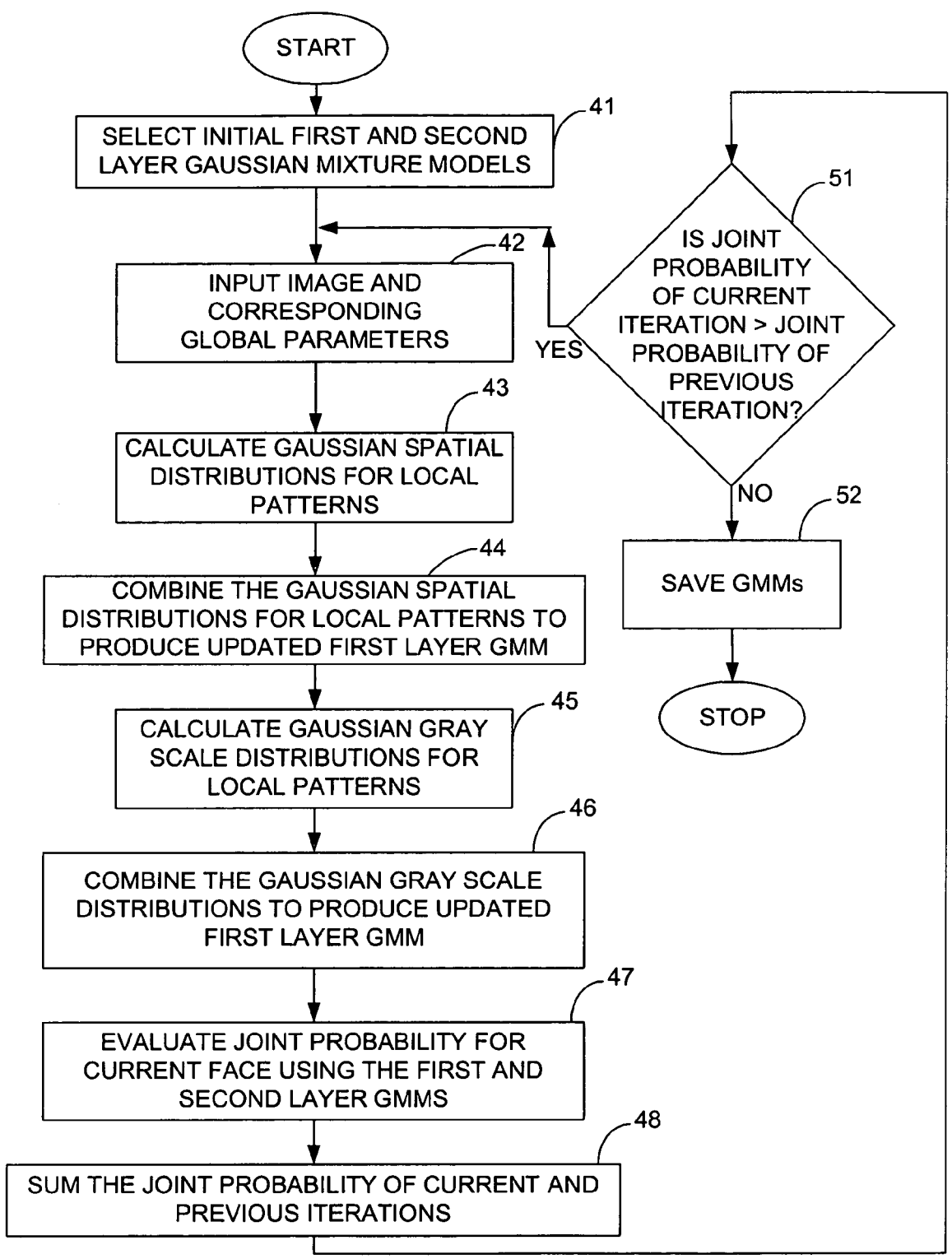
FIG. 2 illustrates a flowchart demonstrating a method for training the two-layer GMM for subsequent use in performing face detection.

FIG. 2 illustrates a flowchart that represents the training algorithm 20 for training the two-layer GMM in accordance with an exemplary embodiment. An initial two-layer GMM that models faces is selected, as indicated by block 41. The initial two-layer model is made up of a combination of an initial first-layer GMM that models local feature in terms of their spatial locations and a second-layer GMM that models local features in terms of their variations in intensity. The GMMs are typically selected based on the number of local features used. For example, if twelve local features are to be used, the GMM will have twelve Gaussian distributions. If eight local features are to be used, the GMM will have eight Gaussian distributions.

Once the initial two-layer model has been selected, images that will be used to train the model, as well as the global parameters that correspond to the images, are input to the computer 10, as indicated by block 42. The images that are used to train the two-layer GMM are typically downloaded from a database (not shown) that includes the global parameters associated with each image. When the user obtains the global parameters associated with an input image, the user may manually set the global parameters using an input device (e.g., keyboard 33 and/or mouse 34). Alternatively, the global parameters may be contained in a file that is downloaded with the input image from the database, in which case the global parameters may be automatically read from the file by the computer 10 and set by the computer 10.

The algorithm 20 updates the initial first-layer GMM by processing the input image using the set of global parameters associated with the input image to generate Gaussian spatial distributions, as indicated by block 43. The training algorithm 20 calculates the Gaussian spatial distributions by selecting local regions (e.g., 10×10 pixels), and processing the pixel intensity values of the local regions in accordance with a Gaussian spatial distribution algorithm that computes a Gaussian spatial distribution for each of the preselected local facial features. For example, if the face image is 200×200 pixels in size, forty 10×10 pixel regions will be processed to obtain a Gaussian spatial distribution for each of the preselected local facial features. The forty resulting Gaussian spatial distributions are then combined to produce an updated first-layer GMM, as indicated by block 44.

The appearance of each of the types of local features typically varies from person to person, even for the same set of global parameters. This is typically due to factors such as, for example, differences in lighting conditions at the time that the images are captured. These variations in appearance are represented electronically by differences in the gray scale values of the pixels. The gray scale values represent intensity. For example, a pixel that has an intensity value that is represented by an 8-bit binary number can range in intensity from 0 (darkest) to 256 (brightest).

The training algorithm 20 calculates the Gaussian gray scale distributions by selecting local regions (e.g., 10×10 pixels) and computing a Gaussian gray scale distribution for each of the regions using the corresponding global parameters, as indicated by block 45. Using the example given above of an input face image that is 200×200 pixels in size, a Gaussian gray scale distribution is calculated for each of the forty 10×10 pixel regions. The forty resulting Gaussian gray scale distributions are then combined to produce an updated second-layer GMM, as indicated by block 46.

Although the steps represented by blocks 43-46 are shown in FIG. 2 as being separate, they preferably are performed simultaneously. The updated two-layer GMM is then used to evaluate the joint probability for the current iteration, as indicated by block 47. The joint probability for the current iteration is then summed with the joint probability for the previous iteration, as indicated by block 48. A determination is then made as to whether or not the joint probability for the current iteration is greater than the joint probability for the previous iteration, as indicated by block 51.

If a determination is made that the joint probability for the current iteration is greater than the joint probability for the previous iteration, then the training of the two-layer GMM is not complete. Therefore, the process returns to block 42 and the next image is input for processing. If a determination is made that the joint probability for the current iteration is not greater than the joint probability for the previous iteration, then the training of the two-layer GMM is complete. The final trained two-layer GMM is then saved, as indicated by block 52, so that it can subsequently be used to perform face detection.

The joint probability is given by the following expectation maximization (EM) equation:

$$p(X \mid \Theta) = \sum a_i p_i(Y \mid \omega_i) p_i(X \mid \theta_i), \quad \text{(Equation 1)}$$

where $\Theta = \{a_1, \ldots, a_M, \omega_1, \ldots, \omega_M, \theta_1, \ldots \theta_M\}$ such that $$\sum_{i=1}^{M} p_i(.) = 1 \text{ and } \sum_{i=1}^{M} a_i = 1.$$

The variable $a_i$ is the weight for pattern i, and normally corresponds to the probability of pattern i. X is the observed local feature from the current candidate local region. X is a vector represented by the pixel intensity values. The global parameters and the region center position relative to the face center are used to form Y. Y is a vector represented by the global parameter values, e.g., angle, size, etc. The variables $\omega_i$ and $\theta_i$ are the Gaussian distribution parameters of the first-layer and second-layer GMMs, respectively. Because a GMM is assumed at each layer, $\omega_i$ and $\theta_i$ represent the mean and covariance matrices of the distribution, respectively.

The symbol $\Theta$ in Equation 1 defines the two-layer GMM. It is learned during the training algorithm. Given a set of X and Y, the algorithm 20 will learn the $\Theta$ that maximizes the joint probability of $p(x|\Theta)$. Thus, the training algorithm 20 selects sets of X and Y until a $\Theta$ is obtained that maximizes the joint probability of $p(x|\Theta)$.

Figure 3:
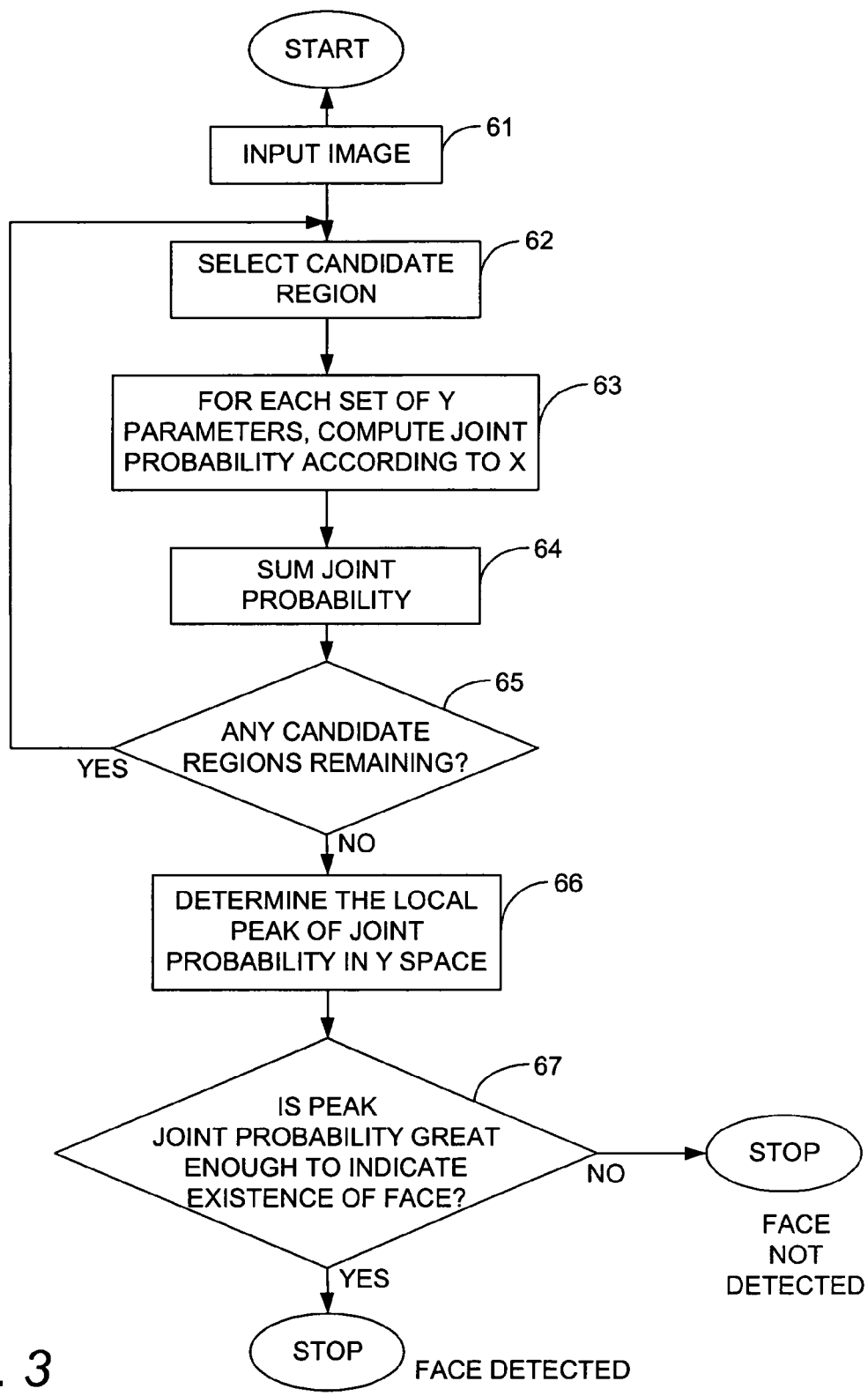
FIG. 3 illustrates a flowchart demonstrating the method for using the trained two-layer GMM to perform face detection.

After the training process is complete, the face detection algorithm 30 may be used to detect faces. FIG. 3 illustrates a flowchart that represents the method of the invention in accordance with an exemplary embodiment for detecting faces. The input image to be inspected is input to the computer 10, as indicated by block 61. The first candidate region of the image (e.g., 10×10 pixels) to be processed is then selected, as indicated by block 62. For this candidate region, the joint probability represented by Equation 1 is computed, as indicated by block 63. This computation is performed in the following manner. The results of the trained two-layer GMM obtained by the training algorithm 20, such as the values of the mean and covariance matrices, are used as parameters in Equation 1 by the face detection algorithm 30. At the first-layer GMM, $p_i(Y|\omega_i)$ is calculated, which is the probability of pattern i given specific Y and $\omega_i$. Given pattern i, $p_i(X|\theta_i)$ is calculated at the second-layer GMM, which is the probability of X given $\theta_i$.

Once $p_i(Y|\omega_i)$ and $p_i(X|\theta_i)$ have been calculated, they are multiplied by each other in accordance with Equation 1 to obtain the joint probability for the current candidate region. Once the joint probability has been calculated for the current candidate region, it is summed with the joint probabilities that have already been calculated for other candidate regions that have already been processed, as indicated by block 64. If the candidate region selected at block 62 is the first candidate region to be processed, no other joint probabilities will have been calculated. A determination is then made at block 65 as to whether or not any candidate regions remain to be processed. If so, the algorithm returns to block 62 and the next candidate region is selected. If not, the process proceeds to block 66.

At block 66, the local peak of the joint probability resulting from the calculations performed at blocks 63 and 64 is determined. The joint probability of $p(x|\Theta)$ represents the hypothesis of the likelihood of a face existing. In other words, each region will generate a joint probability similar to a probability density function (PDF) in the Y space according to Equation 1. When multiple local regions generate high joint probabilities simultaneously for the same Y values, the likelihood of a face existing increases. Thus, the face detection process becomes a process of detecting the peak of the joint probabilities in the multi-dimensional space formed by Y.

Once a determination is made that the peak joint probability has been detected, a determination is made as to whether the peak is great enough to indicate the existence of a face, as indicated by block 67. If so, the detection results 35 (FIG. 1) output from computer 10 indicate that a face has been detected. If not, the detection results 35 output from computer 10 indicate that a face has not been detected. The detection results 35 may be displayed on the display monitor 31.

The apparatus and method provide several improvements over current face detection approaches. One advantage is that more facial features may be used, even if they are not clearly defined salient features, which improves robustness and accuracy. Another advantage is that partitioning of local regions can be learned. Thus, a local region will provide support for detection in all possible ways, but with different probabilities. In other words, each local region can be processed to determine a joint probability for a given set of Y parameters, and the corresponding probability provides an indication as to the likelihood that a face is detected. Another advantage is that recognition in a continuous three-dimensional (3-D) space is made possible due to the fact that in the top layer, the models are trained in a joint multi-dimensional space formed by different Y features (e.g., pose, size, etc.). This is in contrast to most existing methods in which faces of different poses are required to be trained separately, and pose detection needs to be performed before face detection may be attempted.

The computer 10 comprises one or more processors for performing the above described computations. The processor may be any type of computational device that is suitable for performing the functions described above with reference to FIGS. 1-3, including for example, a microprocessor, a microcontroller, an application specific integrated circuit (ASIC), a programmable gate array, etc. The processor may be implemented solely in hardware or in a combination of hardware and software. In the case where the processor is implemented in a combination of hardware and software, the software programs executed by the processor will be stored in a memory device of the computer 10, or in some other computer-readable medium. The computer-readable medium may be well known memory devices such as, for example, random access memory (RAM), dynamic RAM (DRAM), flash memory, read only memory (ROM) compact disk ROM (CD-ROM), digital video disks (DVDs), magnetic disks, magnetic tapes, etc. The invention also encompasses electrical signals modulated on wired and wireless carriers (e.g., electrical conductors, wireless carrier waves, etc.) in packets and in non-packet formats.

It should be noted that the invention has been described with reference to preferred and exemplary embodiments, and that the invention is not limited to the embodiments described herein. For example, although the training and detection algorithms have been described as being performed in software, they may instead be performed solely in hardware, or in a combination of hardware and software. Also, although the training and detection algorithms have been described as being performed on the same computer 10, the may be performed on separate computers. For example, one computer system may be used to train the two-layer GMM, and then the trained two-layer GMM may be shipped to a customer (e.g., on a computer-readable medium) who then downloads the trained GMM to a different computer system and uses the trained GMM to detect faces.

It should also be noted that while the invention has been described with reference to a multi-layer GMM, the second layer need not be a GMM. The second layer may be any local feature detection algorithm that provides local feature detection output to the first-layer GMM. A variety of detection algorithms are suitable for this purpose, including, for example, those known detection algorithms described above. In addition, the invention may be used for other types of detection applications other than face detection.

An image is comprised of one or more objects, each of which has multiple features associated with it. As such, faces can be considered to be objects that have associated local features or patterns. Thus, the invention is not limited to being used for face detection. Persons skilled in the art will understand, in view of the description provided herein, that the invention may be used for a variety of image processing purposes and is not limited to face detection.

Those skilled in the art will understand, in view of the description provided herein, the manner in which these and other modifications may be made to the embodiments described herein, and that all such embodiments are within the scope of the invention.

What is claimed is:

1. An apparatus for generating a model that can be used to perform object detection, the apparatus comprising:
    an input interface configured to receive training images; and
    a processor in communication with the input interface for receiving training images from the input interface, the processor being configured to perform a training algorithm, the training algorithm processing multiple training images received from the input interface to produce a Gaussian Mixture Model (GMM) comprising at least a first-layer GMM, the first-layer GMM describing spatial attributes of local features contained in an image, the first-layer GMM receiving local feature detection results from a local feature detection algorithm.

2. The apparatus of claim 1, wherein the local feature detection algorithm is a second-layer GMM describing intensity variation attributes of local features contained in the image.

3. The apparatus of claim 2, wherein the first-layer GMM is generated by using one or more global parameters associated with the training images to calculate Gaussian spatial distributions for the training images, the first logic combining the Gaussian spatial distributions to produce the first-layer GMM.

4. The apparatus of claim 3, wherein said one or more global parameters include a pose.

5. The apparatus of claim 3, wherein said one or more global parameters include a size of the training image.

6. The apparatus of claim 3, wherein said one or more global parameters include a distance of the training image away from an image capture device that was used to capture the training image.

7. The apparatus of claim 2, wherein the second-layer GMM is generated by using pixel gray scale intensity values of regions of the training image that include local features to calculate Gaussian gray scale distributions for the local features, the first logic combining the Gaussian gray scale distributions to produce the first-layer GMM.

8. An apparatus for performing object detection, the apparatus comprising:
an input interface configured to receive images; and
a processor in communication with the input interface, the processor being configured to perform a face detection algorithm, the algorithm processing an input image received from the input interface to determine a probability that the input image fits a Gaussian Mixture Model (GMM) comprising at least a first-layer GMM that describes spatial attributes of local features contained in an image, and a local feature detection algorithm, the first-layer GMM receiving local feature detection results from the local feature detection algorithm.

9. The apparatus of claim 8, wherein the local feature detection algorithm is a second-layer GMM that describes intensity variation attributes of local features contained in the image.

10. The apparatus of claim 9, wherein the first-layer GMM is generated by using one or more global parameters associated with training images to calculate Gaussian spatial distributions for the training images, the first logic combining the Gaussian spatial distributions to produce the first-layer GMM.

11. The apparatus of claim 10, wherein said one or more global parameters include a pose.

12. The apparatus of claim 10, wherein said one or more global parameters include a size of the training image.

13. The apparatus of claim 10, wherein said one or more global parameters include a distance of the training image away from an image capture device that was used to capture the training image.

14. The apparatus of claim 10, wherein the second-layer GMM is generated by using pixel gray scale intensity values of regions of the training image that include local features to calculate Gaussian gray scale distributions for the local features, the first logic combining the Gaussian gray scale distributions to produce the first-layer GMM.

15. A method for training a model to perform object detection comprising:
processing multiple images in a processor in accordance with a training algorithm to produce a multi-layer Gaussian Mixture Model (GMM) comprising at least first layer GMM and a second-layer GMM, the first-layer GMM describing spatial attributes of local features contained in an image, the second-layer GMM describing intensity variation attributes of local features contained in the image.

16. The method of claim 15, wherein the first-layer GMM is generated by using one or more global parameters associated with the training images to calculate Gaussian spatial distributions for the training images, and by combining the Gaussian spatial distributions to produce the first-layer GMM.

17. The method of claim 15, wherein said one or more global parameters include a pose.

18. The method of claim 15, wherein said one or more global parameters include a size of the training image.

19. The method of claim 15, wherein said one or more global parameters include a distance of the training image away from an image capture device that was used to capture the training image.

20. The method of claim 15, wherein the second-layer GMM is generated by using pixel gray scale intensity values of regions of the training image that include local features to calculate Gaussian gray scale distributions for the local features, the first logic combining the Gaussian gray scale distributions to produce the first-layer GMM.

21. A method for performing object detection comprising:
processing an input image in a processor to determine a probability that the input image fits a multi-layer Gaussian Mixture Model (GMM) comprising at least first layer GMM and a second-layer GMM, the first-layer GMM describing spatial attributes of local features contained in an image, the second-layer GMM describing intensity variation attributes of local features contained in the image.

22. The method of claim 21, wherein the first-layer GMM is generated by using one or more global parameters associated with training images to calculate Gaussian spatial distributions for the training images, and by combining the Gaussian spatial distributions to produce the first-layer GMM.

23. The method of claim 21, wherein said one or more global parameters include a pose.

24. The method of claim 21, wherein said one or more global parameters include a size of the training image.

25. The method of claim 21, wherein said one or more global parameters include a distance of the training image away from an image capture device that was used to capture the training image.

26. The method of claim 21, wherein the second-layer GMM is generated by using pixel gray scale intensity values of regions of the training image that include local features to calculate Gaussian gray scale distributions for the local features, and by combining the Gaussian gray scale distributions to produce the first-layer GMM.

27. A computer program for generating a model that can be used to perform object detection, the computer program being embodied on a computer-readable medium, the program comprising:
code for performing a training algorithm, the training algorithm processing multiple training images to produce a multi-layer Gaussian Mixture Model (GMM) comprising at least first layer GMM and a second-layer GMM, the first-layer GMM describing spatial attributes of local features contained in an image, the second-layer GMM describing intensity variation attributes of local features contained in the image.

28. A computer program for performing object detection, the program being embodied on a computer-readable medium, the program comprising:
code for processing an input image to determine a probability that the input image fits a multi-layer Gaussian Mixture Model (GMM) comprising at least first layer GMM and a second-layer GMM, the first-layer GMM describing spatial attributes of local features contained in an image, the second-layer GMM describing intensity variation attributes of local features contained in the image.

* * * * *